United States Patent
Goodman et al.

(10) Patent No.: US 8,131,491 B2
(45) Date of Patent: Mar. 6, 2012

(54) METHOD AND APPARATUS FOR EVALUATING DATA REPRESENTING A PLURALITY OF EXCITATIONS OF A PLURALITY OF SENSORS

(75) Inventors: Charles Edward Goodman, Chesterfield, MO (US); William Brian Hayes, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 451 days.

(21) Appl. No.: 12/409,708

(22) Filed: Mar. 24, 2009

(65) Prior Publication Data

US 2010/0250169 A1 Sep. 30, 2010

(51) Int. Cl.
*G06F 19/00* (2011.01)

(52) U.S. Cl. ............ 702/77; 702/66; 702/104; 702/116; 73/1.01

(58) Field of Classification Search .................... 702/77, 702/56, 66, 104, 116, 85, 130; 73/1.01
See application file for complete search history.

(56) References Cited

U.S. PATENT DOCUMENTS 6,947,858 B2   9/2005   Goodman et al.

*Primary Examiner* — Drew A Dunn
*Assistant Examiner* — Hien Vo
(74) *Attorney, Agent, or Firm* — Law Office of Donald D. Mondul

(57) ABSTRACT

A method for evaluating data representing a plurality of excitations of a plurality of sensors; the method comprising: (a) storing the data as a plurality of entries in an information store; each respective sensor-excitation pair being a respective entry; (b) exercising a fit relationship employing at least one first sine value to determine a fit value substantially simultaneously for at least a portion of the plurality of entries; (c) ascertaining a measure of fit error between the data and the fit value for the portion of entries; (d) employing the measure of fit error to estimate at least one next sine value; (e) employing the at least one next sine value to perform a fit optimization operation with the data substantially simultaneously for the portion of entries; and (f) repeating steps (c) through (e) until a desired number of the sine values has been exercised.

20 Claims, 4 Drawing Sheets

FIG. 4

TERMS IN EQUATION [1]

| DATA | CONSTANT TERMS (302) | | | | | | | | | SINE "1" TERMS (304) | | | | | | | | | | | | SINE "i" TERMS (306) | | | | | | | | | | | |
|---|---|---|---|---|---|---|---|---|---|---|---|---|---|---|---|---|---|---|---|---|---|---|---|---|---|---|---|---|---|---|---|---|
| | | | | | | | | | | | MODAL CHARACTERISTICS | | | | | | INPUT CHARACTERISTICS | | | | | | MODAL CHARACTERISTICS | | | | | | INPUT CHARACTERISTICS | | | |
| | $C_{1,1}$ | $C_{2,1}$ | $C_{j,1}$ | $C_{1,2}$ | $C_{2,2}$ | $C_{j,2}$ | $C_{1,k}$ | $C_{2,k}$ | $C_{j,k}$ | $\omega_1, \zeta_1$ | $A^O_{1,1}$ | $\Phi^O_{1,1}$ | $A^O_{1,2}$ | $\Phi^O_{1,2}$ | $A^O_{1,j}$ | $\Phi^O_{1,\varphi}$ | $A^E_{1,2}$ | $\Phi^E_{1,2}$ | $A^E_{1,k}$ | $\Phi^E_{1,k}$ | $\omega_i, \zeta_i$ | $A^O_{i,1}$ | $\Phi^O_{i,1}$ | $A^O_{i,2}$ | $\Phi^O_{i,2}$ | $A^O_{i,j}$ | $\Phi^O_{i,\varphi}$ | $A^E_{i,2}$ | $\Phi^E_{i,2}$ | $A^E_{i,k}$ | $\Phi^E_{i,k}$ |
| $Y_{1,1}$ | X | | | | | | | | | X X | X | X | | | | | | | | | X X | X | X | | | | | | | | |
| $Y_{2,1}$ | | X | | | | | | | | X X | | | X X | | | | | | | | X X | | | X X | | | | | | | |
| $Y_{j,1}$ | | | X | | | | | | | X X | | | | | X X | | | | | | X X | | | | | X X | | | | | |
| $Y_{1,2}$ | | | | X | | | | | | X X | X | X | | | | | X X | | | | X X | X | X | | | | | X X | | | |
| $Y_{2,2}$ | | | | | X | | | | | X X | | | X X | | | | X X | | | | X X | | | X X | | | | X X | | | |
| $Y_{j,2}$ | | | | | | X | | | | X X | | | | | X X | | X X | | | | X X | | | | | X X | | X X | | | |
| $Y_{1,k}$ | | | | | | | X | | | X X | X | X | | | | | | | X X | | X X | X | X | | | | | | | X X | |
| $Y_{2,k}$ | | | | | | | | X | | X X | | | X X | | | | | | X X | | X X | | | X X | | | | | | X X | |
| $Y_{j,k}$ | | | | | | | | | X | X X X | | | | | X X | | | | X X | | X X | | | | | X X | | | | X X | |

300

METHOD AND APPARATUS FOR EVALUATING DATA REPRESENTING A PLURALITY OF EXCITATIONS OF A PLURALITY OF SENSORS

TECHNICAL FIELD

The present invention is directed to evaluation of data, and especially to evaluation of test data representing a plurality of excitations of a plurality of sensors. The present invention is particularly useful to identify, by way of example and not by way of limitation, structural frequency, damping, mode shape and other aircraft flight modal parameters from flight test time history response data.

BACKGROUND

In effecting identification of aircraft modal parameters such as, by way of example and not by way of limitation, structural frequency, damping and mode shape, from flight test time history response data may be difficult because the test data may contain responses from multiple, coupled modes.

One approach to identifying such modal parameters is by manual single degree of freedom evaluating methods such as using a form of logarithmic decrement. Such manual evaluations are unable to properly characterize coupled mode behavior. The results produced by such methods may vary from one sensor to the next as well as from one excitation to the next. Mode shape information is not provided by such methods.

Another approach to identifying such modal parameters is disclosed in U.S. Pat. No. 6,947,858, issued Sep. 20, 2005, to Goodman et al., and assigned to the assignee of the present application (hereinafter referred to as "Goodman '858"). Goodman '858 addressed multiple sensors or gauges for a given excitation and properly characterized coupled mode behavior. This treatment did characterize mode shape. Goodman '858 did not address treating data from a plurality of excitations for a plurality of sensors or gauges. The frequency, damping, and mode shape identification may vary from one excitation to the next with that approach.

There is a need for a method and apparatus for evaluating data, such as flight test data, representing a plurality of excitations of a plurality of sensors.

SUMMARY

A method for evaluating data representing a plurality of excitations of a plurality of sensors; the method comprising: (a) storing the data as a plurality of entries in an information store; each respective sensor-excitation pair being a respective entry; (b) exercising a fit relationship employing at least one first sine value to determine a fit value substantially simultaneously for at least a portion of the plurality of entries; (c) ascertaining a measure of fit error between the data and the fit value for the portion of entries; (d) employing the measure of fit error to estimate at least one next sine value; (e) employing the at least one next sine value to perform a fit optimization operation with the data substantially simultaneously for the portion of entries; and (f) repeating steps (c) through (e) until a desired number of the sine values has been exercised.

An apparatus for evaluating test data from a plurality of excitations of a plurality of sensors; the apparatus comprising: (a) an information store for storing the test data as a plurality of data entries; each respective sensor-excitation pair being a respective data entry; (b) an evaluation unit coupled with the information store; the evaluation unit exercising an iteration of a fit relationship employing at least one first sine value to determine a fit value substantially simultaneously for at least a portion of data entries of the plurality of data entries; (c) the evaluation unit ascertaining a measure of fit error between the test data and the fit value for at least the portion of data entries; (d) the evaluation unit employing the measure of fit error to estimate at least one next sine value; (e) the evaluation unit employing the at least one next sine value to perform a fit optimization operation with the test data substantially simultaneously for at least the portion of data entries; and (f) the evaluation unit repeating steps (c) through (e) until a desired number of the sine values has been exercised.

It is, therefore, a feature of the present disclosure to provide a method and apparatus for evaluating data, such as flight test data, representing a plurality of excitations of a plurality of sensors.

Further features of the present disclosure will be apparent from the following specification and claims when considered in connection with the accompanying drawings, in which like elements are labeled using like reference numerals in the various figures, illustrating the preferred embodiments of the disclosure.

BRIEF DESCRIPTION OF THE DRAWINGS

FIG. 4 is a schematic diagram of distribution of elements occurring when exercising the present invention.

DETAILED DESCRIPTION

Figure 1:
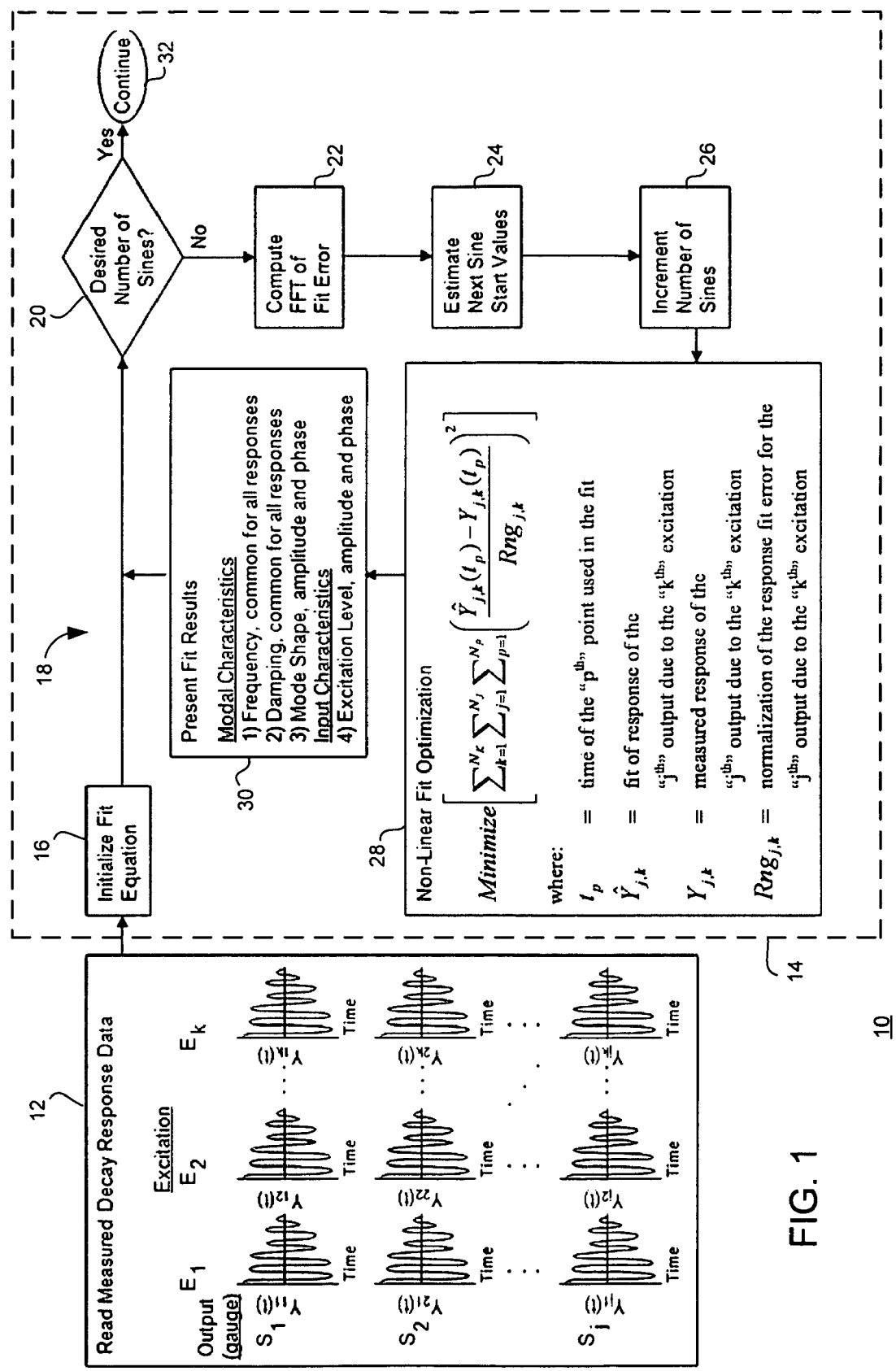
FIG. 1 is a schematic diagram of the apparatus of the present disclosure.

FIG. 1 is a schematic diagram of the apparatus of the present disclosure. In FIG. 1, an apparatus 10 may include an information store 12 and an evaluation unit 14. Test data may be stored in information store 12 indicating test results for a plurality of excitations $E_1$, $E_2$, $E_k$. The indicator "k" is employed to signify that there can be any number of excitations for which data may be stored in information store 12. The inclusion of three excitations $E_1$, $E_2$, $E_k$ in FIG. 1 is illustrative only and does not constitute any limitation regarding the number of excitations for which data may be stored in information store 12 in the apparatus of the present disclosure. For each excitation $E_k$, test data may be stored in information store 12 indicating test results for a plurality of sensors or gauges $S_1$, $S_2$, $S_j$. The indicator "j" is employed to signify that there can be any number of sensors for which data may be stored in information store 12. The inclusion of three sensors $S_1$, $S_2$, $S_j$ in FIG. 1 is illustrative only and does not constitute any limitation regarding the number of sensors for which data may be stored in information store 12 in the apparatus of the present disclosure.

Each sensor $S_j$ may have associated stored time-dependent excitation responses. Sensor $S_1$ may have a stored associated first time-dependent excitation response $Y_{11}(t)$ due to excitation $E_1$, a stored associated second time-dependent excitation response $Y_{12}(t)$ due to excitation $E_2$ and a stored associated kth time-dependent excitation response $Y_{1k}(t)$ due to excitation $E_k$. Sensor $S_2$ may have a stored associated first time-dependent excitation response $Y_{21}(t)$ due to excitation $E_1$, a stored associated second time-dependent excitation response $Y_{22}(t)$ due to excitation $E_2$ and a stored associated kth time-dependent excitation response $Y_{2k}(t)$ due to excitation $E_k$. Sensor $S_j$ may have a stored associated first time-dependent excitation response $Y_{j1}(t)$ due to excitation $E_1$, a stored associated second time-dependent excitation response $Y_{j2}(t)$ due to excitation $E_2$ and a stored associated kth time-dependent excitation response $Y_{jk}(t)$ due to excitation $E_k$.

Throughout this description, use of a reference numeral using a generic subscript herein may be taken to mean that any respective member of the plurality of elements having the same reference numeral may be regarded as included in the description. Thus, by way of example and not by way of limitation, referring to sensor $S_j$ in describing FIG. 1 may be taken to mean that any sensor—$S_1$, $S_2$ $S_j$ (FIG. 1)—may be regarded as capable of employment as described. Also, by way of example and not by way of limitation, referring to excitation $E_k$ in describing FIG. 1 may be taken to mean that any excitation—$E_1$, $E_2$, $E_k$ (FIG. 1)—may be regarded as capable of employment as described.

The time-dependent excitation responses $Y_{jk}(t)$ for sensor-excitation pairs $(S_j, E_k)$ may be stored in a matrix format in information store 12.

Evaluation unit 14 may include an initializing unit 16 and loop 18 coupled with information store 12 for exercising a fit relationship substantially simultaneously employing at least a portion of the time-dependent excitation responses $Y_{jk}(t)$ for sensor-excitation pairs $(S_j, E_k)$ with at least one first sine value to determine a fit value. It may be preferred that the fit relationship be expressed as:

$$\hat{Y}_{j,k}(t) = C_{j,k} + \sum_{i=1}^{N} e^{-D_i(t-t_1)} A_{i,j}^O A_{i,k}^E \sin(\omega_i(t-t_1) + \Phi_{i,j}^O + \Phi_{i,k}^E) \quad [1]$$

where:
t=time
$t_1$=time of the first point used in the fit
$\hat{Y}_{j,k}$=fit of the response of the "$j^{th}$" output due to the "$k^{th}$" excitation
$C_{j,k}$=constant term in the fit for the "$j^{th}$" output and "$k^{th}$" excitation
N=number of damped sine waves in the fit
$D_i$=damping term for the "$i^{th}$" sine in the fit for all outputs and excitations
$A_{i,j}^O$=amplitude term for the "$i^{th}$" sine in the fit for the "$j^{th}$" output
$A_{i,k}^E$=amplitude term for the "$i^{th}$" sine in the fit for the "$k^{th}$" excitation $A_{i,1}^E=1.0$
$\omega_i$=frequency term for the "$i^{th}$" sine in the fit for all outputs and excitations
$\Phi_{i,j}^O$=phase term for the "$i^{th}$" sine in the fit for the "$j^{th}$" output
$\Phi_{i,k}^E$=phase term for the "$i^{th}$" sine in the fit for the "$k^{th}$" excitation $\Phi_{i,1}^E=0.0$
and:

$$\zeta_i = D_i / \sqrt{\omega_i^2 + D_i^2},$$

viscous damping ratio

Initializing unit 16 exercises a fit relationship substantially simultaneously employing at least a portion of the time-dependent excitation responses $Y_{jk}(t)$ for sensor-excitation pairs $(S_j, E_k)$ with zero sines, thus only including the constant term in Equation [1], to determine a fit value.

A loop 18 may be coupled with initializing unit 16. Loop 18 may include a query unit 20, a fit error unit 22, a sine value estimating unit 24, an incrementing unit 26, an optimization unit 28 and a results unit 30. Query unit 20, fit error unit 22, sine value estimating unit 24, incrementing unit 26, optimization unit 28 and results unit 30 may cooperate to effect evaluation of the fit equation initialized in initializing unit 16 (e.g., Equation [1] above). The initialized fit equation may be queried by query unit whether the desired number of sines has been employed in evaluating fit. If the response to the query posed by query unit 20 is "NO", then fit error unit 22 may evaluate the fit error associated with the presently extant equation or expression. Fit error unit 22 may employ a fast Fourier transform to effect the evaluation. Sine value estimating unit 24 may use the results of the evaluation of fit error effected by fit error unit 22 to estimate the next sine starting values for use in fit optimization by fit optimization unit 28. Incrementing unit 26 may use results provided by sine value estimating unit 24 to increment the sine values for use by fit optimization unit 28.

Fit optimization unit 28 may effect a fit optimization operation with the extant equation or expression and results of the fit optimization may be presented by results unit 30. Fit optimization may be carried out using any appropriate optimization technique as may be selected by one skilled in the art of fit optimization. A representative fit optimization expression or technique is illustrated in FIG. 1 employing the following expression to effect non-linear fit optimization:

$$\text{Minimize} \left[ \sum_{k=1}^{N_K} \sum_{j=1}^{N_J} \sum_{p=1}^{N_P} \left( \frac{\hat{Y}_{j,k}(t_p) - Y_{j,k}(t_p)}{Rng_{j,k}} \right)^2 \right] \quad [2]$$

where:
$t_p$=time of the "$p^{th}$" point used in the fit
$\hat{Y}_{j,k}$=fit of the response of the "$j^{th}$" output due to the "$k^{th}$" excitation
$Y_{j,k}$=measured response of the "$j^{th}$" output due to the "$k^{th}$" excitation
$Rng_{j,k}$=normalization of the response fit error for the "$j^{th}$" output and "$k^{th}$" excitation After each iteration of loop 18, query unit 20 may pose a query whether the desired number of sines has been employed in evaluating fit. If the response to the query posed by query unit 20 is "NO", then fit error unit 22 may evaluate the fit error associated with the presently extant equation or expression and loop 18 may perform a next iterative operation substantially as described above. If the response to the query posed by query unit 20 is "YES", then optimization efforts by evaluating unit 14 are ceased and results are provided for further employment elsewhere, as indicated at 32.

Figure 2:
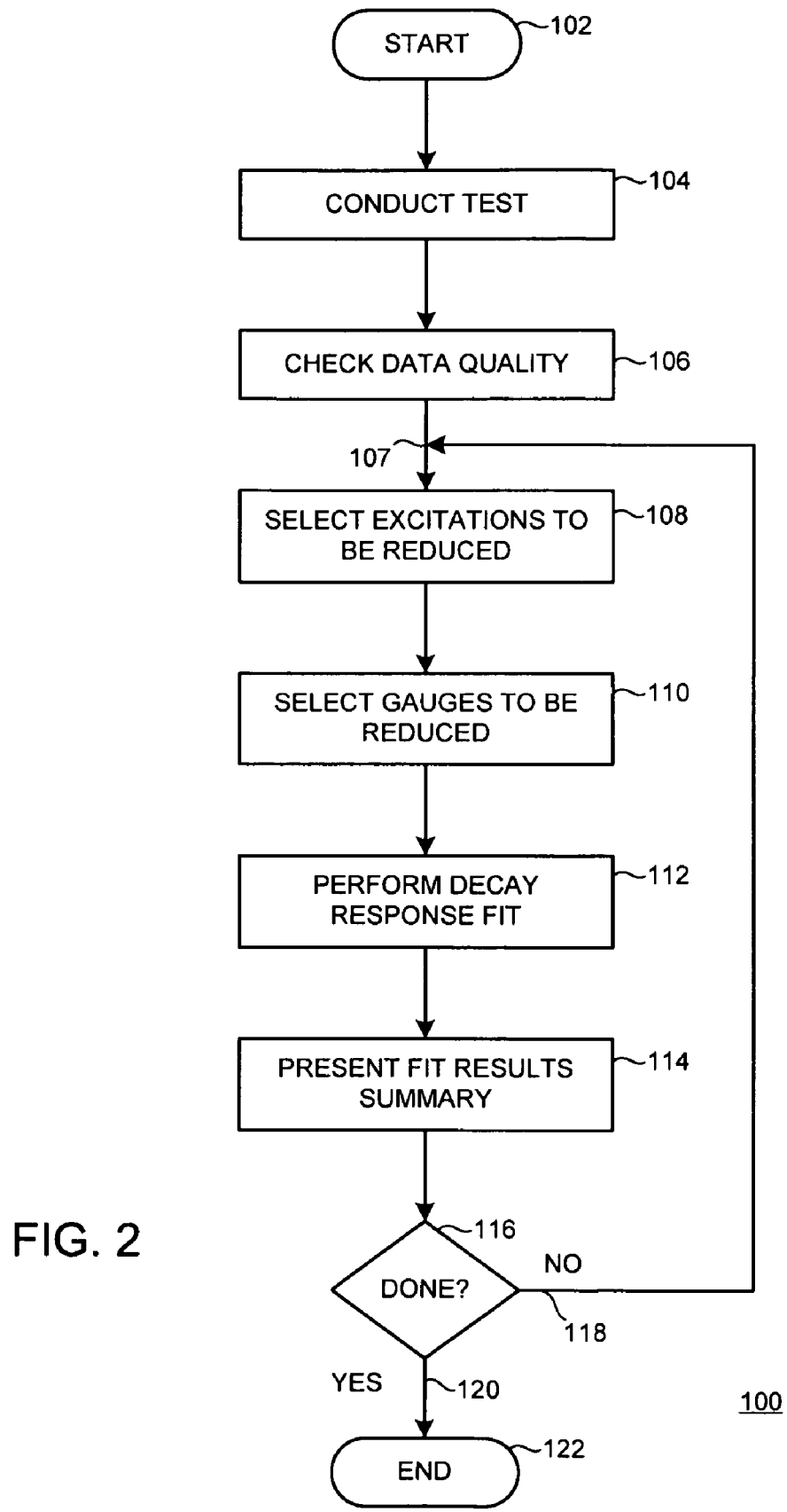
FIG. 2 is a flow chart illustrating a process in which the present disclosure may be employed.

FIG. 2 is a flow chart illustrating a process in which the present disclosure may be employed. In FIG. 2, a process 100 may begin at a START locus 102. Process 100 may continue with conducting a test, as indicated by a block 104. Process 100 may continue with checking quality of data gleaned from the test (block 104), as indicated by a block 106.

Process 100 may continue with selecting excitations to be reduced, as indicated by a block 108. Process 100 may continue with selecting gauges to be reduced, as indicated by a block 110.

Process 100 may continue with performing a decay response fit, as indicated by a block 112. It is in connection with block 112 that the process described in FIG. 1 may be advantageously employed.

Process 100 may continue with presenting a fit results summary, as indicated by a block 114.

Process 100 may continue by posing a query whether process 100 is complete (as may be determined by predetermined criteria), as indicated by a query block 116. If process 100 is not complete, process 100 may proceed from query block 116 via a NO response line 118 to a locus 107 and process 100 may continue by performing steps represented by blocks 108, 110, 112, 114, 116. If process 100 is complete, process 100 may proceed from query block 116 via a YES response line 120 to an END locus 122.

Figure 3:
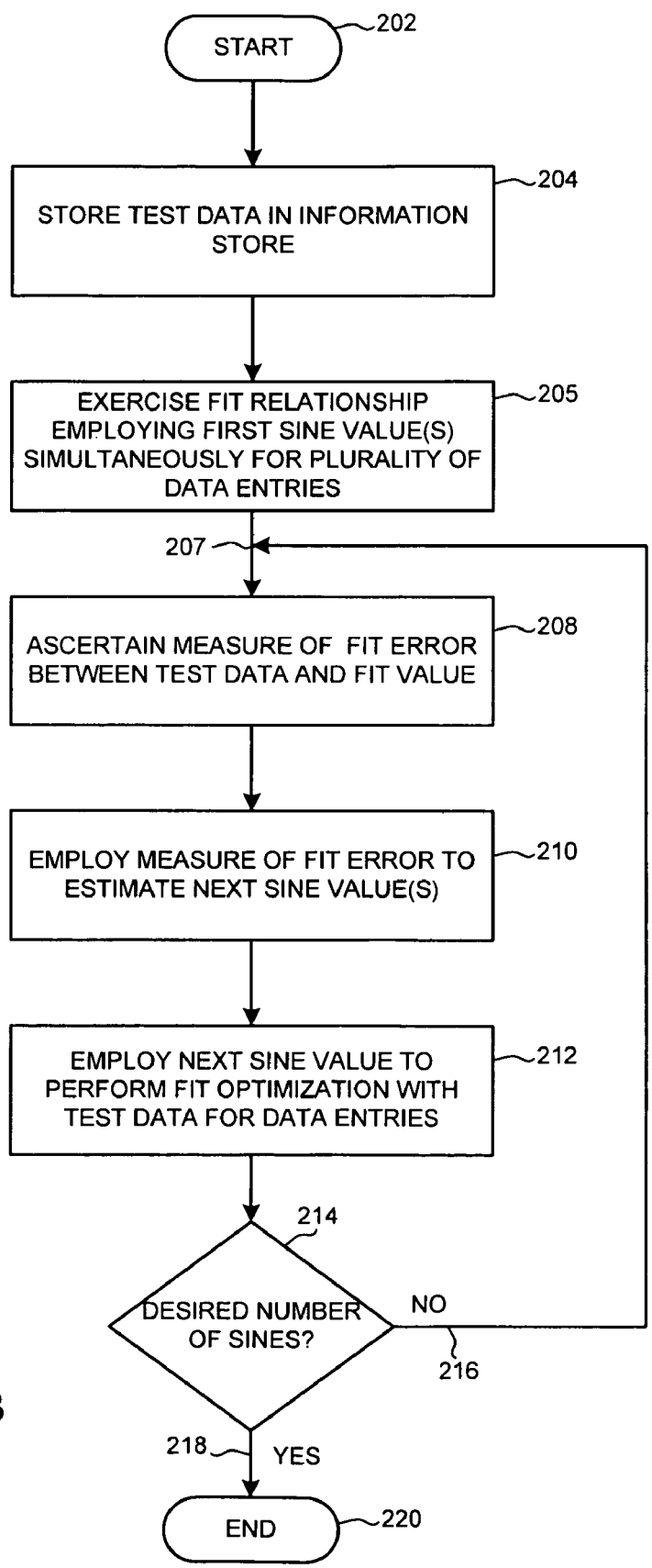
FIG. 3 is a flow chart illustrating the method of the present disclosure.

FIG. 3 is a flow chart illustrating the method of the present disclosure. In FIG. 3, a method 200 for evaluating test data from a plurality of excitations of a plurality of sensors may begin at a START locus 202. Method 200 may continue with storing the test data as a plurality of sensor-excitation pair data entries in an information store, as indicated by a block 204.

Method 200 may continue with exercising an iteration of a fit relationship employing only the constant terms in Eq. 1 to determine a fit value substantially simultaneously for at least a portion of data entries of the plurality of data entries, as indicated by a block 205.

Method 200 may continue with ascertaining a measure of fit error between the test data and the fit value for at least the portion of data entries, as indicated by a block 208.

Method 200 may continue with employing the measure of fit error to estimate at least one next sine value, as indicated by a block 210.

Method 200 may continue with employing the at least one next sine value to perform a fit optimization operation with the test data substantially simultaneously for at least the portion of data entries, as indicated by a block 212.

Method 200 may continue with posing a query whether a desired number of the sine values has been exercised, as indicated by a query block 214. If the desired number of sine values has not been exercised, method 200 may proceed from query block 214 via a NO response line 216 and return to a locus 207 to repeat steps represented by blocks 208, 210, 212, 214. If the desired number of sine values has been exercised, method 200 may proceed from query block 214 via a YES response line 218 to terminate at an END locus 220.

FIG. 4 is a schematic diagram of utilization of elements when exercising the present invention. In FIG. 4, a matrix 300 indicates the utilization of elements involved in exercising a non-linear fit optimization using Equation [1]. Data elements 301 associated with time-dependent excitation responses $Y_{j,k}$(t) of sensors $S_j$ due to excitations $E_k$ (FIG. 1) establish rows in matrix 300. Equation [1] elements 302, 304, and 306 associated with CONSTANT TERMS, SINE "1" TERMS, and SINE "i" TERMS establish columns in matrix 300. An array of "X" indicators defines the data elements that are used to define each of the Equation [1] elements during exercising of apparatus 10.

CONSTANT TERMS 302 are terms initially determined in block 16 in apparatus 10 (FIG. 1). T CONSTANT TERMS $C_{1,1}$, $C_{2,1}$, $C_{j,1}$, $C_{1,2}$, $C_{2,2}$, $C_{j,2}$, $C_{1,k}$, $C_{2,k}$, $C_{j,k}$ may be adjusted in block 28 (FIG. 1) throughout operation of apparatus 10.

Remaining columns of FIG. 4 include SINE "1" TERMS 304 and SINE "i" TERMS 306. SINE "1" TERMS 304 are included as part of Equation [1] for the first iteration of apparatus 10 following exercising of loop 18. SINE "i" TERMS 306 are included as part of Equation [1] for the $i^{th}$ iteration of apparatus 10 following exercising of loop 18. The indicator "i" is employed to signify that there can be any number of additional sines included as part of Equation [1] for each additional exercising of loop 18.

SINE "1" TERMS 304 portion of FIG. 4 indicates by an array of "X" indicators the data elements that are to be used to define those Equation [1] elements for the first sine value during exercising of apparatus 10. Thus, during a first iteration of apparatus 10 following exercising of loop 18 there will be values identified for frequency $\omega_1$, damping factor $\zeta_1$, amplitude and phase terms $(A^O_{1,1}\Phi^O_{1,1} A^O_{1,2}\Phi^O_{1,2} A^O_{1,j}\Phi^O_{1,j})$ and excitation level terms $(A^E_{1,2}\Phi^E_{1,2} A^E_{1,k}\Phi^E_{1,k})$. During this first iteration of apparatus 10, CONSTANT TERMS 302 may be adjusted. The optimization unit 28 (FIG. 1) determines the optimal fit values for CONSTANT TERMS 302 and SINE "1" TERMS 304 given all of the data values $Y_{1,1}$ through $Y_{j,k}$.

The frequency $\omega_1$ and damping factor $\zeta_1$ terms for the first sine value are utilized in the fit for all of the data values $Y_{1,1}$ through $Y_{j,k}$. Amplitude and phase terms using superscript "O" define a mode shape. Thus, the mode shapes for the first sine value are expressed in terms of $(A^O_{1,1}\Phi^O_{1,1} A^O_{1,2}\Phi^O_{1,2} A^O_{1,j}\Phi^O_{1,j})$. Mode shape terms associated with sensor $S_1$ $(A^O_{1,1}\Phi^O_{1,1})$ are common for each of data elements $Y_{1,1}$, $Y_{1,2}$, $Y_{1,k}$ associated with sensor $S_1$ due to excitations $E_1, E_2, E_k$. Mode shape terms associated with sensor $S_2$ $(A^O_{1,2}\Phi^O_{1,2})$ are common for each of data elements $Y_{2,1}$, $Y_{2,2}$, $Y_{2,k}$ associated with sensor $S_2$ due to excitations $E_1, E_2, E_k$. Mode shape terms associated with sensor $S_j$ $(A^O_{1,j}\Phi^O_{1,j})$ are common for each of data elements $Y_{j,1}$, $Y_{j,2}$, $Y_{j,k}$ associated with sensor $S_j$ due to excitations $E_1, E_2, E_k$.

Amplitude and phase terms using superscript "E" indicate terms attributable to a particular excitation. Thus, an excitation level $(A^E_{1,2}\Phi^E_{1,2})$ is an excitation level of the first sine value for each of data elements $Y_{1,2}$, $Y_{2,2}$, $Y_{j,2}$ associated with sensors $S_1$, $S_2$, $S_j$ due to excitation $E_2$. An excitation level $(A^E_{1,k}\Phi^E_{1,k})$ is an excitation level of the first sine value for each of data elements $Y_{1,k}$, $Y_{2,k}$, $Y_{j,k}$ associated with sensors $S_1$, $S_2$, $S_j$ due to excitation $E_k$.

SINE "i" TERMS 306 portion of FIG. 4 indicates by an array of "X" indicators the data elements that are to be used to define those Equation [1] elements for the $i^{th}$ sine value during exercising of apparatus 10. Thus, during an $i^{th}$ iteration of apparatus 10 following exercising of loop 18 there will be values identified for frequency $\omega_i$, damping factor $\zeta_i$, amplitude and phase terms $(A^O_{i,1}\Phi^O_{i,1} A^O_{i,2}\Phi_O^{i,2} A^O_{i,j}\Phi^O_{i,j})$ and excitation level terms $(A^E_{i,2}\Phi^E_{i,2} A^E_{i,k}\Phi^E_{i,k})$. During this $i^{th}$ iteration of apparatus 10, CONSTANT TERMS 302 and SINE "1" TERMS 304 may be adjusted. The optimization unit 28 (FIG. 1) determines the optimal fit values for CONSTANT TERMS 302, SINE "1" TERMS 304 and SINE "i" TERMS 306 given all of the data values $Y_{1,1}$ through $Y_{j,k}$.

The frequency $\omega_i$ and damping factor $\zeta_i$ terms for the $i^{th}$ sine value are utilized in the fit for all of the data values $Y_{1,1}$ through $Y_{j,k}$. Amplitude and phase terms using superscript "O" define a mode shape. Thus, the mode shapes for the $i^{th}$ sine value are expressed in terms of $(A^O_{i,1}\Phi^O_{i,1} A^O_{i,2}\Phi^O_{i,2} A^O_{i,j}\Phi^O_{i,j})$. Mode shape terms associated with sensor $S_1$ $(A^O_{i,1}\Phi^O_{i,1})$ are common for each of data elements $Y_{1,1}$, $Y_{1,2}$, $Y_{1,k}$ associated with sensor $S_1$ due to excitations $E_1, E_2, E_k$. Mode shape terms associated with sensor $S_2$ $(A^O_{i,2}\Phi^O_{i,2})$ are common for each of data elements $Y_{2,1}$, $Y_{2,2}$, $Y_{2,k}$ associated with sensor $S_2$ due to excitations $E_1, E_2, E_k$. Mode shape terms associated with sensor $S_j$ $(A^O_{i,j}\Phi^O_{i,j})$ are common for each of data elements $Y_{j,1}$, $Y_{j,2}$, $Y_{j,k}$ associated with sensor $S_j$ due to excitations $E_1, E_2, E_k$.

Amplitude and phase terms using superscript "E" indicate terms attributable to a particular excitation. Thus, an excitation level $(A^E_{i,2}\Phi^E_{i,2})$ is an excitation level of the $i^{th}$ sine value for each of data elements $Y_{1,2}$, $Y_{2,2}$, $Y_{j,2}$ associated with sensors $S_1$, $S_2$, $S_j$ due to excitation $E_2$. An excitation level ($A^E_{i,k}\Phi^E_{i,k}$) is an excitation level of the $i^{th}$ sine value for each of data elements $Y_{1,k}, Y_{2,k}, Y_{j,k}$ associated with sensors $S_1, S_2, S_j$ due to excitation $E_k$.

It may be worthy of note that for each sine value, common frequency and damping ($\omega_1\zeta_1$ and $\omega_i\zeta_i$) are enforced for each sensor-excitation pair. That is, for each associated column in matrix 300, there is an indicator "X" for the every data element. This may be also manifested in there neither being a "j" index nor a "k" index associated with common frequency and damping terms. It may be further worthy of note that for each sine value, a common mode shape ($A^O_{1,1}\Phi^O_{1,1}A^O_{1,2}\Phi^O_{1,2}A^O_{1,j}\Phi^O_{1,j}$ and $AOi_{,1}\Phi^O_{i,1}A^O_{i,2}\Phi^O_{i,2}A^O_{i,j}\Phi^O_{i,j}$) is enforced for each excitation. That is, for each associated column in matrix 300, there is an indicator "X" for the data elements associated with the corresponding sensor for each excitation. This may be also manifested in there being a "j" index associated with common mode shape terms, but no "k" index being associated with common mode shape terms. It may be worthy of further note that for each sine value, a common excitation level ($A^E_{1,2}\Phi^E_{1,2}A^E_{1,k}\Phi^E_{1,k}$ and $A^E_{i,2}\Phi^E_{i,2}A^E_{i,k}\Phi^E_{i,k}$) is enforced across all sensors. That is, for each associated column in matrix 300, there is an indicator "X" for the data elements associated with the corresponding excitation for each sensor. This may be manifested in there being a "k" index associated with excitation level terms, but no "j" index being associated with excitation level terms.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A method for evaluating test data from a plurality of excitations of a plurality of sensors; the method comprising:
   (a) storing said test data as a plurality of sensor-excitation pair data entries in an information store;
   (b) exercising an iteration of a fit relationship in an evaluation unit coupled with said information store employing at least one first sine value to determine a fit value substantially simultaneously for at least a portion of data entries of said plurality of data entries;
   (c) ascertaining a measure of fit error in said evaluation unit between said test data and said fit value for at least said portion of data entries;
   (d) employing said measure of fit error in said evaluation unit to estimate at least one next sine value;
   (e) employing said at least one next sine value in said evaluation unit to perform a fit optimization operation with said test data substantially simultaneously for at least said portion of data entries; and
   (f) repeating steps (c) through (e) until a desired number of said sine values has been exercised.

2. The method for evaluating test data from a plurality of excitations of a plurality of sensors as recited in claim 1 wherein said at least said portion of data entries is all data entries of said plurality of data entries.

3. The method for evaluating test data from a plurality of excitations of a plurality of sensors as recited in claim 1 wherein said exercising an iteration of a fit relationship is effected using a fast Fourier transform.

4. The method for evaluating test data from a plurality of excitations of a plurality of sensors as recited in claim 1 wherein said fit optimization operation is effected using a non-linear fit optimization operation.

5. The method for evaluating test data from a plurality of excitations of a plurality of sensors as recited in claim 2 wherein said exercising an iteration of a fit relationship is effected using a fast Fourier transform.

6. The method for evaluating test data from a plurality of excitations of a plurality of sensors as recited in claim 2 wherein said fit optimization operation is effected using a non-linear fit optimization operation.

7. The method for evaluating test data from a plurality of excitations of a plurality of sensors as recited in claim 3 wherein said fit optimization operation is effected using a non-linear fit optimization operation.

8. The method for evaluating test data from a plurality of excitations of a plurality of sensors as recited in claim 7 wherein said fit optimization operation is effected using a non-linear fit optimization operation.

9. A method for evaluating data expressed as a plurality of sensor-excitation pair entries representing a plurality of excitations of a plurality of sensors; the method comprising:
   (a) storing said plurality of sensor-excitation pair entries in an information store;
   (b) substantially simultaneously for each respective sensor-excitation pair entry of said plurality of sensor-excitation pair entries:
      (1) exercising a fit relationship in an evaluation unit coupled with said information store employing a first sine value to determine a fit value;
      (2) ascertaining a measure of fit error in said evaluation unit between each said respective sensor-excitation pair entry and said fit value;
      (3) employing said measure of fit error in said evaluation unit to estimate a next sine value; and
      (4) employing said next sine value in said evaluation unit to perform a fit optimization operation with each said respective sensor-excitation pair entry; and
   (c) repeating step (b) until a desired number of said sine values has been exercised.

10. The method for evaluating data expressed as a plurality of sensor-excitation pair entries representing a plurality of excitations of a plurality of sensors as recited in claim 9 wherein said exercising an iteration of a fit relationship is effected using a fast Fourier transform.

11. The method for evaluating data expressed as a plurality of sensor-excitation pair entries representing a plurality of excitations of a plurality of sensors as recited in claim 9 wherein said fit optimization operation is effected using a non-linear fit optimization operation.

12. The method for evaluating data expressed as a plurality of sensor-excitation pair entries representing a plurality of excitations of a plurality of sensors as recited in claim 10 wherein said fit optimization operation is effected using a non-linear fit optimization operation.

13. An apparatus for evaluating test data from a plurality of excitations of a plurality of sensors; the apparatus comprising:
   (a) an information store for storing said test data as a plurality of data entries; each respective sensor-excitation pair being a respective data entry; and
   (b) an evaluation unit coupled with said information store; said evaluation unit exercising an iteration of a fit relationship employing at least one first sine value to determine a fit value substantially simultaneously for at least a portion of data entries of said plurality of data entries; said evaluation unit ascertaining a measure of fit error between said test data and said fit value for at least said portion of data entries; said evaluation unit employing said measure of fit error to estimate at least one next sine value;

said evaluation unit employing said at least one next sine value to perform a fit optimization operation with said test data substantially simultaneously for at least said portion of data entries;

said evaluation unit repeating said ascertaining a measure of fit error, said estimating at least one next sine value and said performing said fit optimization operation until a desired number of sine values has been exercised.

14. The apparatus for evaluating test data from a plurality of excitations of a plurality of sensors as recited in claim 13 wherein said at least said portion of data entries is all data entries of said plurality of data entries.

15. The apparatus for evaluating test data from a plurality of excitations of a plurality of sensors as recited in claim 13 wherein said exercising an iteration of a fit relationship is effected using a fast Fourier transform.

16. The apparatus for evaluating test data from a plurality of excitations of a plurality of sensors as recited in claim 13 wherein said fit optimization operation is effected using a non-linear fit optimization operation.

17. The apparatus for evaluating test data from a plurality of excitations of a plurality of sensors as recited in claim 14 wherein said exercising an iteration of a fit relationship is effected using a fast Fourier transform.

18. The apparatus for evaluating test data from a plurality of excitations of a plurality of sensors as recited in claim 14 wherein said fit optimization operation is effected using a non-linear fit optimization operation.

19. The apparatus for evaluating test data from a plurality of excitations of a plurality of sensors as recited in claim 15 wherein said fit optimization operation is effected using a non-linear fit optimization operation.

20. The apparatus for evaluating test data from a plurality of excitations of a plurality of sensors as recited in claim 19 wherein said fit optimization operation is effected using a non-linear fit optimization operation.

\* \* \* \* \*